United States Patent
Vedula et al.

(10) Patent No.: US 9,688,805 B2
(45) Date of Patent: Jun. 27, 2017

(54) ELASTOMER RESINS, FIBERS AND FABRICS THEREOF, AND USES THEREOF

(75) Inventors: Ravi R. Vedula, North Ridgeville, OH (US); James E. Bryson, Jr., Cuyahoga Falls, OH (US); Mouh-Wahng Lee, Solon, OH (US); Daniel M. Fischer, Brentwood, TN (US); Christopher A. Sprague, Cuyahoga Falls, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 467 days.

(21) Appl. No.: 13/995,307

(22) PCT Filed: Dec. 19, 2011

(86) PCT No.: PCT/US2011/065746
§ 371 (c)(1),
(2), (4) Date: Jun. 18, 2013

(87) PCT Pub. No.: WO2012/087884
PCT Pub. Date: Jun. 28, 2012

(65) Prior Publication Data
US 2013/0273285 A1  Oct. 17, 2013

Related U.S. Application Data

(60) Provisional application No. 61/425,320, filed on Dec. 21, 2010.

(51) Int. Cl.
| | | |
|---|---|---|
| *C08G 18/42* | (2006.01) |
| *D01D 5/08* | (2006.01) |
| *C08G 18/32* | (2006.01) |
| *C08G 18/48* | (2006.01) |
| *C08G 18/66* | (2006.01) |
| *C08G 18/76* | (2006.01) |
| *C08L 75/04* | (2006.01) |
| *D01F 6/70* | (2006.01) |
| *D01F 6/78* | (2006.01) |
| *D01F 6/86* | (2006.01) |

(52) U.S. Cl.
CPC ..... *C08G 18/4238* (2013.01); *C08G 18/3206* (2013.01); *C08G 18/4854* (2013.01); *C08G 18/664* (2013.01); *C08G 18/7671* (2013.01); *C08L 75/04* (2013.01); *D01F 6/70* (2013.01); *D01F 6/78* (2013.01); *D01F 6/86* (2013.01); *D01D 5/08* (2013.01); *Y10T 428/139* (2015.01); *Y10T 428/249921* (2015.04)

(58) Field of Classification Search
CPC ............ C08G 18/3206; C08G 18/4238; C08G 18/4854; C08G 18/664; C08G 18/7671; D01F 6/70; D01F 6/78; D01F 6/86; C08L 75/04; C08L 2666/20; Y10T 428/139; Y10T 428/249921; D01D 5/08
USPC ................ 428/36.9, 36.91, 36.92, 221, 35.7; 525/440.01
See application file for complete search history.

(56) References Cited

U.S. PATENT DOCUMENTS

| | | |
|---|---|---|
| 4,877,856 A | 10/1989 | Hall et al. |
| 7,202,322 B2 | 4/2007 | Vedula et al. |
| 7,300,331 B2 | 11/2007 | Baran et al. |
| 7,763,351 B2 | 7/2010 | Vedula et al. |
| 2004/0092696 A1 | 5/2004 | Vedula et al. |
| 2004/0266301 A1 | 12/2004 | Vedula et al. |
| 2007/0082579 A1 | 4/2007 | Baran et al. |
| 2009/0100723 A1* | 4/2009 | Farkas ............... C08G 18/0895 36/30 R |

FOREIGN PATENT DOCUMENTS

| | | |
|---|---|---|
| EP | 0592668 B1 | 3/1999 |
| WO | 2005/005697 A1 | 1/2005 |
| WO | 2010/151633 A1 | 12/2010 |

* cited by examiner

*Primary Examiner* — Yan Lan
(74) *Attorney, Agent, or Firm* — Eryn Ace Fuhrer; Teresan W. Gilbert

(57) ABSTRACT

The present invention relates to elastomeric resins, fibers made from said resins, fabrics made with said fibers, and applications and uses for the resins, fibers and fabrics. The elastomer resins of the invention provide high strength fibers and well balanced fabrics with good physical properties and chemical resistance, making them attractive for use in various applications that use elastic fibers and fabrics.

10 Claims, No Drawings

ELASTOMER RESINS, FIBERS AND FABRICS THEREOF, AND USES THEREOF

CROSS REFERENCE TO RELATED APPLICATION

This application claims priority from PCT Application Ser. No. PCT/US2011/065746 filed on Dec. 19, 2011, which claims the benefit of U.S. Provisional Application No. 61/425,320 filed on Dec. 21, 2010.

FIELD OF THE INVENTION

The present invention relates to elastomeric resins, fibers made from said resins, fabrics made with said fibers, and applications and uses for the resins, fibers and fabrics. The elastomer resins of the invention provide high strength fibers and fabrics with good physical properties and chemical resistance, making them attractive for use in various applications that use elastic fibers and fabrics.

BACKGROUND OF THE INVENTION

Garments and other articles are prepared using fabrics. Fabrics are prepared from fibers. Fibers are prepared from resins. By controlling the chemical composition of the resin, and the form of the fiber, one can control various properties of the fibers made from the resin, and also the properties of the fabric made from the fibers, and the garment made from the fabric. The invention deals with specific elastomeric resins that may be used to prepare improved fibers, which may be used to prepare improved fabrics, which may be used to prepare improved garments and other articles.

In recent years, the demand for greater functionality in fabrics, including demand for fabric with a combination of performance and comfort, and particularly in garments made from such fabrics, has increased demand for specialized fabrics including compression fabrics. Compression fabrics, which are generally prepared from a combination of two or more different types of fibers, provide compression, however, they often become uncomfortable due to increased heat buildup and often become too tight or too heavy or too bulky. It would be desirable for a garment, and other articles made from such fabrics, to provide an optimal degree of compression specific to the wearer without loss of comfort.

Conventional compression fabrics also have limited balance, that is, conventional fabrics often have good stretch and related physical properties in one direction or axis, but not in the other. Fabrics with good properties in both directions (in both the weft/width and warp/length direction) are referred to as well balanced fabrics, and in some embodiments the fabric has very similar, to essentially equivalent properties, such as modulus, in both directions. Often, fabrics have acceptable weft direction stretch but less than desirable warp direction stretch. It would be desirable for a compression fabric, which may be used to prepare garments and other articles, to have good balance without the loss of its other desirable properties. It would also be desirable for a compression fabric, which may be used to prepare garments and other articles, to have improved warp direction stretch without the loss of its other desirable properties.

Conventional compression fabrics also have limited solvent resistance, making them unsuitable or at least less useful in applications that may include exposure to one or more solvents. It would be desirable for a compression fabric, which may be used to prepare garments and other articles, to have good solvent resistance without the loss of its other desirable properties.

Conventional compression fabrics also have limited alkali and chlorine resistance, making them unsuitable or at least less useful in applications that may include exposure to alkali bases or chlorine, for example, in the production of swimwear and related items, or for use in items that will be commercially laundered. It would be desirable for a compression fabric, which may be used to prepare garments and other articles, to have good alkali and chlorine resistance without the loss of its other desirable properties.

European Patent EP 0592668 B1 relates to thermoplastic polyurethane elastomers and processes for making the same, however the reference does not teach composition with molecular weights as high as those of the invention described herein, particularly those that still possess the elastomeric properties and processability described despite the unusually high molecular weight.

U.S. Pat. No. 7,300,331 teaches brassieres or other breast shaping garments and discusses the benefits of using balanced fabrics in their construction. However, the reference achieves a well balanced fabric by building a multi-layer fabric where the layers are oriented in such a way as to provide an overall piece of fabric, albeit a multi-layer, that has some balance. The reference provides no teaching of single layer fabrics that themselves have good balance.

SUMMARY OF THE INVENTION

It is an object of the present invention to provide an elastomer resin which is prepared by reacting: (i) a hydroxyl terminated polyester intermediate derived from a dicarboxylic acid and a blend of at least two alkylene glycols wherein two of the alkylene glycols have a number average molecular weight that differs by at least 20 percent; (ii) a diisocyanate; and (iii) a linear alkylene glycol chain extender. The resulting resin has a weight average molecular weight of at least 600,000, and in some embodiments, a polydispersity index of at least 3.

The invention also provides a melt-spun fiber, film, hose (i.e., tubing), or any other extruded part made from the resins described herein, wherein the resin is further reacted with: (iv) an agent comprising the reaction product of a polyalkylene ether glycol and a diisocyanate. The resulting fiber has a weight average molecular weight of at least 700,000.

The invention also provides for a fabric made from any of the fibers described herein. In some embodiments, the fibers of the invention are used in combination with one or more conventional fibers to produce a fabric.

The invention also provides for articles, such as garments, made from the fabrics described herein.

The invention also provides a method of making an elastomer resin that includes reacting in an internal mixing device: (i) a hydroxyl terminated polyester intermediate derived from a dicarboxylic acid and a blend of at least two alkylene glycols wherein two of the alkylene glycols have a number average molecular weight that differs by at least 20 percent; (ii) a diisocyanate and (iii) a linear alkylene glycol chain extender. The resulting resin has a weight average molecular weight of at least 600,000 and in some embodiments a polydispersity index of at least 3.

The invention also provides a method of making a fiber, film, or hose that includes: (1) preparing any of the elastomer resins described herein in an internal mixing device; (2) further reacting the resin composition with an agent which may be the reaction product of a polyalkylene ether glycol and a diisocyanate; and (3) processing said elastomer resin into a fiber, film, or hose wherein said fiber, film, or hose has a weight average molecular weight of at least 700,000. In some embodiments, the method provides a melt spun fiber that is a monofilament fiber.

The invention also provides a method of making a fabric that includes: (1) preparing any of the elastomer resins described herein in an internal mixing device; (2) further reacting the resin composition with an agent which may be the reaction product of a polyalkylene ether glycol and a diisocyanate; (3) melt-spinning said elastomer resin into a fiber wherein said fiber has a weight average molecular weight of at least 700,000; and (4) processing said fiber, optionally in combination with one or more other fibers, into a fabric.

The invention also provides a method of improving the solvent resistance of an article, wherein said article comprises a fabric and wherein said fabric is comprised of fibers. The method includes the steps of: (1) preparing any of the elastomer resins described herein in an internal mixing device; (2) further reacting the resin composition with an agent which may be the reaction product of a polyalkylene ether glycol and a diisocyanate; (3) melt-spinning said elastomer resin into a fiber wherein said fiber has a weight average molecular weight of at least 700,000; (4) processing said fiber, optionally in combination with one or more other fibers, into a fabric; and (5) processing said fabric into said article with improved solvent resistance.

The invention also provides a method of improving the alkali and chlorine resistance of an article, wherein said article comprises a fabric and wherein said fabric is comprised of fibers. The method includes the steps of: (1) preparing any of the elastomer resins described herein in an internal mixing device; (2) further reacting the resin composition with an agent which may be the reaction product of a polyalkylene ether glycol and a diisocyanate; (3) melt-spinning said elastomer resin into a fiber wherein said fiber has a weight average molecular weight of at least 700,000; (4) processing said fiber, optionally in combination with one or more other fibers, into a fabric; and (5) processing said fabric into said article with improved alkali resistance.

The invention also provides a method of improving the warp direction stretch of a finished knit stretch fabric. The method includes the steps of: (1) preparing any of the elastomer resins described herein in an internal mixing device; (2) further reacting the resin composition with an agent which may be the reaction product of a polyalkylene ether glycol and a diisocyanate; (3) melt-spinning said elastomer resin into a fiber wherein said fiber has a weight average molecular weight of at least 700,000; and (4) processing said fiber, optionally in combination with one or more other fibers, into a knit stretch fabric which has improved warp direction stretch.

In any of these embodiments, the fiber used may be a monofilament fiber or a multifilament fiber. In some embodiments, the fiber is a monofilament fiber.

The compositions of the invention, particularly the resins and the fibers, are easy to extrude. The compositions of the invention are unique when compared to traditional TPU resins and fiber compositions. Generally, the resins of the invention can be melted and maintained at a stable viscosity without the expected crystallized chunks, gels, or flushing problems that occur during periodic line stoppages.

DETAILED DESCRIPTION OF THE INVENTION

Various preferred features and embodiments will be described below by way of non-limiting illustration.

The Resin

The invention provides an elastomer resin, which may be used in the preparation of fibers, fabrics, and various articles. The resin may be prepared by reacting: (i) a hydroxyl terminated polyester intermediate derived from a dicarboxylic acid and a blend of at least two alkylene glycols (or diols) wherein two of the alkylene glycols have a number average molecular weight that differs by at least 20 percent; (ii) a diisocyanate; and (iii) a linear alkylene glycol chain extender.

The hydroxyl terminated polyester intermediate may be derived from a dicarboxylic acid and a mixture of two or more linear glycols. Suitable dicarboxylic acids include aliphatic acids, cycloaliphatic acids, aromatic acids, or combinations thereof. Suitable dicarboxylic acids which may be used alone or in mixtures generally have a total of from 4 to 15 carbon atoms. Examples of suitable acids include: succinic acid, glutaric acid, adipic acid, pimelic acid, suberic acid, azelaic acid, sebacic acid, dodecanedioic acid, isophthalic acid, terephthalic acid, cyclohexane dicarboxylic acid, and combinations thereof. Anhydrides of any of the above dicarboxylic acids, including phthalic anhydride and tetrahydrophthalic anhydride, may also be used. In some embodiments, the acid is adipic acid.

The hydroxyl terminated polyester intermediate is derived from a mixture of two or more alkylene glycols. In some embodiments, the alkylene glycols used in the invention are linear alkylene glycols and may contain from 2 to 10 carbon atoms. In some embodiments, the glycols have the formula: HO—R—OH where R is an alkylene group containing from 1 or 2 up to 20 or 10 carbon atoms. In other embodiments, R contains from 1 to 6, 2 to 4, or even 3 or 4 carbon atoms. In any of these embodiments, R may be a linear alkylene group.

As noted, the two alkylene glycols used in the blend have a number average molecular weight that differs by at least 20 percent. That is, the difference in the molecular weight of the two alkylene glycols is at least 20 percent of the molecular weight of the alkylene glycol with the higher molecular weight.

In some embodiments, the blend of alkylene glycols includes at least two alkylene glycols where the first alkylene glycol contains at least 1 carbon atom more than the second alkylene glycol. This distinction may be used in combination with, or in some embodiments instead of, the percent difference in molecular weight discussed above. In other embodiments, the first alkylene glycol may contain at least 2 carbon atoms more than the second alkylene glycol. In still other embodiments, the first alkylene glycol contains from 1 to 10, 1 to 6, 2 to 4, or 2 more carbon atoms that the second alkylene glycol. In any of these embodiments, a third, fourth, or even further alkylene glycol may be present. In some embodiments, the first alkylene glycol and second alkylene glycol make up at least 50 percent by weight of the alkylene glycol blend.

Suitable examples of alkylene glycols include: ethylene glycol, propylene glycol, butanediol, pentanediol, hexanediol, heptanediol, octanediol, nonanediol, decane diol, and combinations thereof. Non-linear alkylene glycols may be used, though generally only in small amounts, and may include, for example: 1,2-propanediol, 1,3-butanediol, 2,2-dimethyl-1,3-propanediol, 1,4-cyclohexanedimethanol, and combinations thereof. In some embodiments, the alkylene glycols include linear alkylene glycols. In these embodiments, suitable examples include: methylene glycol, ethylene glycol, 1,3-propanediol; 1,4-butanediol, 1,5-pentanediol, 1,6-hexanediol, 1,7-heptanediol, 1,8-octanediol, 1,9-heptanediol, 1,10-decanediol, decamethylene glycol, dodecamethylene glycol, and combinations thereof. In some embodiments, the blend of alkylene glycols used in the invention includes 1,4-butanediol and 1,6-hexanediol.

In some embodiments, the blend of alkylene glycols contains a low level of branched alkylene glycols. For example, the blend of polyols may contain no more than 25, 15, 10, 5 or even 1 or 0.5 percent by weight of branched alkylene glycols. In some embodiments, the blend of alkylene glycols is substantially free of, or even fully free of, branched alkylene glycols.

In some embodiments, the blend of alkylene glycols is substantially free of, or even fully free of, alkylene glycols containing an odd number of carbon atoms greater than 3. In other embodiments, the blend of alkylene glycols is substantially free of, or even fully free of alkylene glycols containing 5, 7, 9, 11, 13, or 15 carbon atoms, where the term "substantially free of" is defined similarly as above.

In some embodiments, the blend of alkylene glycols is substantially free of, or even fully free of, neopentyl glycol.

As used herein, the term "substantially free of" means that the material in question is only present in amounts consistent with contamination and/or by-products present in commercial grades of desired components. That is, in some embodiments, branched alkylene glycols are only present in the blend of alkylene glycols at levels consistent with the presence of branched alkylene glycols found in commercial grades of linear alkylene glycols due to contamination, by-products, or other similar sources.

The first and second alkylene glycols may be present in the blend such that the weight ratio of the first glycol to the second glycol is from 95:5 to 5:95 or from 25:75 to 75:25 or from 60:40 to 40:60 or from 55:45 to 45:55. In some embodiments, the weight ratio of the first glycol to the second glycol is 50:50. These ratios apply only to the first and second alkylene glycols present in the blend and do not preclude the presence of additional alkylene glycols.

While not wishing to be bound by theory, it is believed that the crystallinity and/or the glass transition temperature (Tg) of the hydroxyl terminated polyester intermediate, which may also be referred to as the polyol, is a critical feature for providing the performance improvements described herein. In some embodiments, the hydroxyl terminated polyester intermediate has a Tg of less than −20 degrees C.

The resins of the invention are prepared using a diisocyanate. The diisocyanates useful in the present invention are not overly limited. Useful diisocyanates generally have the formula $R(NCO)_n$ where n is generally 2 and R is aromatic, cycloaliphatic, aliphatic, or combinations thereof generally having a total of from 2 to 20 carbon atoms per $R(NCO)_n$ molecule.

The diisocyanates of the invention may include some amount of polyisocyanates having the same formula provided above but having an n of 3 or 4, that is a functionality of 3 or 4. These polyisocyanates may also be utilized in very small amounts, for example, less than 5% and desirably less than 2% by weight based upon the total weight of all polyisocyanates, as they generally lead to increased levels of cross-linking, and so at higher amounts will begin to limit the thermoplastic properties of the resulting compositions.

Examples of suitable aromatic diisocyanates include methylene diphenyl diisocyanate also known as diphenyl methane-4,4'-diisocyanate (MDI), $H_{12}$ MDI, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, and trans-dicyclohexylmethane diisocyanate (HMDI). In some embodiments, the diisocyanate includes aromatic and/or aliphatic diisocyanates. In some embodiments, the diisocyanate includes MDI containing less than about 3% by weight of ortho-para (2,4) isomer.

The resins of the invention can be prepared using a chain extender.

Suitable chain extenders include lower aliphatic or short chain glycols having from about 2 to about 10 carbon atoms and include for instance ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexanediol, 1,3-butanediol, and 1,5-pentanediol. Aromatic glycols can also be used as the chain extender and are often the choice for high heat applications. Benzene glycol (HQEE) and xylylene glycols are suitable chain extenders for use in making the TPU of this invention. Xylylene glycol is a mixture of 1,4-di(hydroxymethyl)benzene and 1,2-di(hydroxymethyl)benzene. Benzene glycol is one suitable aromatic chain extender and specifically includes hydroquinone bis(beta-hydroxyethyl)ether also known as 1,4-di(2-hydroxyethoxy)benzene; resorcinol, i.e., bis(beta-hydroxyethyl)ether also known as 1,3-di(2-hydroxyethyl)benzene; catechol, i.e., bis(beta-hydroxyethyl)ether also known as 1,2-di(2-hydroxyethoxy)benzene; and combinations thereof. In some embodiments, the chain extender of the invention is substantially free of, or even fully free of, benzene glycol.

The chain extenders useful for the invention may include any of the linear alkylene glycols described above. In some embodiments, the chain extender includes a glycol having the formula: HO—R—OH where R is a linear alkylene group containing from 1 or 2 up to 20 or 10 carbon atoms. In other embodiments, R contains from 1 to 6, 2 to 4, or even 3 or 4 carbon atoms. Suitable examples include ethylene glycol, 1,3-propanediol; 1,4-butanediol, 1,5-pentanediol, 1,6-hexanediol, 1,7-heptanediol, 1,8-octanediol, 1,9-heptanediol, 1,10-decanediol, dodecamethylene glycol, and combinations thereof.

In some embodiments, the chain extender used in the invention includes 1,4-butanediol, ethylene glycol, hydroquinone bis(beta-hydroxyethyl)ether, or combinations thereof. In some embodiments, the chain extender includes 1,4-butanediol, 1,6-hexanediol, or combinations thereof. In still other embodiments, the chain extender includes 1,4-butanediol.

The reaction of these components can result in an elastomer resin having a weight average molecular weight of at least 600,000, a polydispersity index of at least 3, or a combination thereof. Controlling the weight average molecular weight of the resin is achieved by adjusting the ratio of components used, reaction residence time, and/or reaction temperature, all of which is within the ability of one skilled in the art. The components may be reacted in the presence of a catalyst. Generally, any conventional catalyst can be utilized to react the diisocyanate with the hydroxyl terminated intermediate or the chain extender and the same is well known to those skilled in the art. Examples of suitable catalysts include the various alkyl ethers or alkyl thiol ethers of bismuth or tin wherein the alkyl portion has from 1 to about 20 carbon atoms with specific examples including bismuth octoate, bismuth laurate, and the like.

Suitable catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming monomers. In other embodiments, the reaction that results in the resin of the invention is carried out without a catalyst. That is, in some embodiments, the process of making the resin is free of any catalyst.

The elastomer resins of this invention can be made by any of the conventional polymerization methods well known in the art and literature.

Elastomer resins of the present invention may be made via a "one shot" process wherein all the components are added together simultaneously or substantially simultaneously to a heated extruder, or other internal mixing device, and reacted to form the resin. The equivalent ratio of the isocyanate groups present in the diisocyanate to the total equivalents of the hydroxyl groups in the hydroxyl terminated intermediate and the diol chain extender is generally from about 0.95 to about 1.10, or from about 0.97 to about 1.03, or even from about 0.97 to about 1.00. The Shore A hardness of the TPU formed should be from 65A to 95A, or from about 75A to about 85A, to achieve the most desirable properties of the finished article. Reaction temperatures are generally from about 175° C. to about 245° C. or from about 180° C. to about 220° C. The weight average molecular weight (Mw) of the resin may be at least 600,000, at least 800,000 or at least 850,000. In other embodiments, the Mw of the resin is from 600,000, 800,000 or even 850,000 up to 1.5 million or even 1.0 million, as measured by GPC relative to polystyrene standards. These molecular weight values are generally in regards to the resin at the time of its use (i.e., when the resin is processed into fibers or other articles), however in various embodiments the molecule weight values referred herein may be applied to the resin at: (i) the time the resin is manufactured; (ii) 20 to 30 days of the resin having been manufactured; (iii) the time the resin is being processed into fibers or some other article; or (iv) any combination thereof. The molecular weight may change over time, depending on the processing conditions under which it was made and the amount of excess raw materials used in the reaction. Generally, the molecular weight of the resin is expected to slowly increase over time, which is a well known tendency of many resins that those skilled in the art would understand. The polydispersity index of the resin may be at least 3, from 3 to 6, from 3 to 5.5 or even from 3.05 to 5.42 and the same aspect of timing, discussed above, applies here as well.

The elastomer resins can also be prepared utilizing a pre-polymer process. In the pre-polymer route, the hydroxyl terminated intermediate is reacted with generally an equivalent excess of one or more polyisocyanates to form a pre-polymer solution having free or unreacted isocyanate therein. The reaction may be carried out at temperatures of from 80° C. to 220° C. or from 150° C. to 200° C. optionally in the presence of a suitable urethane catalyst. Subsequently, a selective type of chain extender as noted above is added in an equivalent amount generally equal to the isocyanate end groups as well as to any free or unreacted diisocyanate compounds. The overall equivalent ratio of the total diisocyanate to the total equivalents of both the hydroxyl terminated intermediate and the chain extender is thus from about 0.95 to about 1.10, or from about 0.98 to about 1.05 or even from about 0.99 to about 1.03. The equivalent ratio of the hydroxyl terminated intermediate to the chain extender is adjusted to give 65A to 95A, or 75A to 85A Shore hardness. The chain extension reaction temperature is generally from about 180° C. to about 250° C. or from about 200° C. to about 240° C. Typically, the pre-polymer route can be carried out in any conventional device with an extruder being preferred. Thus, the hydroxyl terminated intermediate is reacted with an equivalent excess of a diisocyanate in a first portion of the extruder to form a pre-polymer solution and subsequently the chain extender is added at a downstream portion and reacted with the pre-polymer solution. Any conventional extruder can be utilized, with extruders equipped with barrier screws having a length to diameter ratio of at least 20 or at least 25. Where a prepoly process is used, the compositions of the invention may exhibit a lower polydispersity index.

The resins of the present invention may also contain one or more additional additives. Useful additives can be utilized in suitable amounts and include opacifying pigments, colorants, mineral fillers, stabilizers, lubricants, UV absorbers, processing aids, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol) benzotriazoles and 2-hydroxybenzophenones.

Plasticizer additives can also be utilized advantageously to reduce hardness without affecting properties.

Fibers, Fabrics & Articles

The elastic resins of the invention may be processed into fibers, films, hoses or any other extruded article.

In some embodiments, the elastic resins of the invention are melt spun into a fiber where any of the resins described herein are further reacted with: (iv) an agent, such as the reaction product of a polyalkylene ether glycol and a diisocyanate. The resulting fiber has a weight average molecular weight of at least 700,000. Controlling the weight average molecular weight of the fiber is achieved by adjusting the ratio of components used, particularly the amount of cross linker used, and reaction residence time, which is within the ability of one skilled in the art.

The fibers of the invention may be monofilament or multifilament. In some embodiments, the fibers of the invention are monofilament fibers. The weight average molecular weight of the fibers of the invention may be at least 700,000, at least 800,000, or even at least 1 million. In any of these embodiments, the weight average molecular weight of the fibers may also be less than 2 million.

During the melt spinning process, the elastomer resin described above may be lightly cross-linked with an agent, which in some embodiments may be described as a cross-linking agent. The cross-linking agent of the invention is prepared by reacting a polyalkylene ether glycol and a diisocyanate. Suitable polyalkylene ether glycols include polytetramethylene ether glycol (PTMEG). Suitable isocyanates for use in the preparation of the cross-linking agent include any of those described above. In some embodiments, the polyalkylene ether glycol includes PTMEG and the diisocyanate includes MDI.

The cross-linking agent, which may be referred to as a pre-polymer, can have an isocyanate functionality of greater than 1.0, or from 1.0 to 3.0, or even from 1.8 to 2.2, however, it is understood that some portion of the cross-linking agent is made up of molecules with an isocyanate functionality of greater than 2.0. The cross-linking agent may have a number average molecular weight of from 1,000 to 10,000 or from 1,200 to 4,000 or even from 1,500 to 2,800. In some embodiments, the cross-linking agent has a number average molecular weight of at least 1500.

The weight percent of cross-linking agent used with the elastomer resin is from 2.0% to 20%, 8.0% to 15%, or 10% to 13%. The percentage of cross-linking agent used is weight percent based upon the total weight of elastomer resin and cross-linking agent.

The spinning process to make fibers of this invention involves feeding the elastomer resin described above to an extruder to melt the resin. A rheology modifying agent (RMA), for example, the cross-linking agent, is added continuously downstream near the point where the resin melt exits the extruder or after the resin melt exits the extruder. The RMA can be added to the extruder before the melt exits the extruder or after the melt exits the extruder. If added after the melt exits the extruder, the RMA should be mixed with the resin melt using static or dynamic mixers to assure proper mixing. After exiting the extruder, the melt flows into a manifold. The manifold divides the melt stream into one or more smaller streams, where each stream is fed to a plurality of spinnerets. The spinneret will have small holes through which the melt is forced and the melt exits the spinneret in the form of fiber, in some embodiments the fiber remains a monofilament fiber. The size of the holes in the spinneret will depend on the desired size of the fiber.

The polymer melt may be passed through a spin pack assembly and exit the spin pack assembly as a fiber. In some embodiments, the spin pack assembly used is one which gives plug flow of the polymer through the assembly. In some embodiments, the spin pack assembly is the one described in PCT patent application WO 2007/076380, which is incorporated in its entirety herein.

Once the fiber exits the spinneret, it may be cooled before winding onto bobbins. In some embodiments, the fiber is passed over a first godet, finish oil is applied, and the fiber proceeds to a second godet. An important aspect of the process is the relative speed at which the fiber is wound into bobbins. By relative speed, we mean the speed of the melt (melt velocity) exiting the spinneret in relationship to the winding speed of the bobbin. For a typical melt spinning process, the fiber is wound at a speed of 4-6 times the speed of the melt velocity. This draws or stretches the fiber. For the unique fibers of this invention, this extensive drawing is undesirable. The fibers must be wound at a speed at least equal to the melt velocity to operate the process. For the fibers of this invention, the fiber may be wound onto bobbins at a speed no greater than 50% faster than the melt velocity, in other embodiments at a speed no greater than 20%, 10%, or even 5% faster than the melt velocity. It is thought that a winding speed that is the same as the melt velocity would be ideal, but it is necessary to have a slightly higher winding speed to operate the process efficiently. For example, a fiber exiting the spinneret at a speed of 300 meters per minute, would most preferable be wound at a speed of between 300 and 315 meters per minute. Similar examples are readily apparent.

As noted above, the fibers of this invention can be made in a variety of denier. Denier is a term in the art designating the fiber size. Denier is the weight in grams of 9000 meters of fiber length.

When fibers are made by the process of this invention, anti-tack additives such as finish oils, an example of which are silicone oils, may be added to the surface of the fibers after or during cooling and/or just prior to being wound into bobbins.

One important aspect of the melt spinning process is the mixing of the polymer melt with the crosslinking agent. Proper uniform mixing is important to achieve uniform fiber properties and to achieve long run times without experiencing fiber breakage. The mixing of the melt and crosslinking agent should be a method which achieves plug-flow, i.e., first in first out. The proper mixing can be achieved with a dynamic mixer or a static mixer. Static mixers are more difficult to clean; therefore, a dynamic mixer is preferred. A dynamic mixer which has a feed screw and mixing pins is the preferred mixer. U.S. Pat. No. 6,709,147, which is incorporated herein by reference, describes such a mixer and has mixing pins which can rotate. The mixing pins can also be in a fixed position, such as attached to the barrel of the mixer and extending toward the centerline of the feed screw. The mixing feed screw can be attached by threads to the end of the extruder screw and the housing of the mixer can be bolted to the extruder machine. The feed screw of the dynamic mixer should be a design which moves the polymer melt in a progressive manner with very little back mixing to achieve plug-flow of the melt. The L/D of the mixing screw should be from over 3 to less than 30, or from about 7 to about 20, or even from about 10 to about 12.

The temperature in the mixing zone where the TPU polymer melt is mixed with the crosslinking agent may be from about 200° C. to about 240° C., or from about 210° C. to about 225° C. These temperatures are generally necessary to get the reaction while not degrading the polymer.

The spinning temperature (the temperature of the polymer melt in the spinneret) should be higher than the melting point of the polymer. If the spinning temperature is too high, the polymer can degrade. If the spinning temperature is too low, polymer can solidify in the spinneret and cause fiber breakage.

The fibers of the invention may be further processed into fabrics. The fabrics of the invention may be made from any of the fibers described above, which may themselves be made from any of the elastic resins described above. The fabrics may be made by processing any of the fibers described above, optionally in combination with one or more other types of fibers (fibers made from different materials), into a fabric.

The fabrics may be woven fabrics, non-woven fabrics or knitted fabrics. As described above, the fabrics of the invention may be well balanced, in that they have good stretch properties in both axes (in both the weft/width and warp/length direction), which give three dimensional compression in garments. In some embodiments, the stretch of the fabric in both directions, and so its balance, is determined by ASTM D4964. In some embodiments, the fabrics of the invention demonstrate at least 120%, or even 150% stretch performance in both the weft/width and warp/length directions, as measured by ASTM D4964. In some embodiments, the fabric of the invention demonstrate modulus values in the weft/width and warp/length directions that are within 40% of one another, or even within 30%, 25% or even 20% or 10% of each other. The construction of the fabrics made from the resins and fibers described herein is not overly limited, however in some embodiments the fabric is a jersey knit fabric. The invention provides a balanced single layer fabric; however, the fabrics of the invention may still be used in multi-layer constructions, multilayer constructions are just not necessary to achieve good balance in the fabric.

The fabrics, as well as the fibers and even the resins of the invention, may be further processed into articles. In some embodiments, these articles include one or more of the fabrics described above.

Fabrics that utilize the fibers of this invention can be made by knitting or weaving or by non-woven processes such as melt blown or spunbond. In some embodiments, the fabric of this invention is made using one or more different (conventional) fibers in combination with the fibers of the invention. Hard fibers, such as nylon and/or polyester may be used, but others such as rayon, silk, wool, modified acrylic and others can also be utilized to make the fabric of this invention.

The articles of the invention include garments. Various garments can be made with the fabric of this invention. In some embodiments, the fabric is used in making undergarments or tight fitting garments, for which the fabrics of this invention are well-suited due to the comfort provided by the fiber. Undergarments, such as bras and T-shirts as well as sport garments used for activities such as running, skiing, cycling, or other sports, can benefit from the properties of these fibers. It will be understood by those skilled in the art that any garment can be made from the fabric and fibers of this invention. An exemplary embodiment would be a bra shoulder strap made from woven fabric and the wings of the bra made from knitted fabric, with both the woven and the knitted fabric containing the melt spun TPU fibers of this invention.

In other embodiments, the fibers described herein are used to make one or more of any number of garments and articles including but not limited to: sports apparel, such as shorts, including biking, hiking, running, compression, training, golf, baseball, basketball, cheerleading, dance, soccer and/or hockey shorts; shirts, including any of the specific types listed for shorts above; tights including training tights and compression tights; swimwear including competitive and resort swimwear; bodysuits including wrestling, running and swimming body suits; and footwear. Additional embodiments include workwear such as shirts and uniforms. Additional embodiments include intimates including bras, panties, men's underwear, camisoles, body shapers, nightgowns, panty hose, men's undershirts, tights, socks and corsetry. Additional embodiments include medical garments and articles including: hosiery such as compression hosiery, diabetic socks, static socks, and dynamic socks; therapeutic burn treatment bandages and films; wound care dressings; medical garments. Additional applications include military applications that mirror one or more of the specific articles described above. Additional embodiments include bedding articles including sheets, blankets, comforters, mattress pads, mattress tops, and pillow cases.

The fibers of the invention may be bare or covered.

Still another feature of the present invention is that the fibers described herein have greater strength, for example, they produce a fabric with a higher burst strength, compared to more conventional fibers of the same gauge, and/or provide the same or even higher strength compared to conventional fibers of a larger gauge. That is, the fibers of the present invention provide greater strength at the same or even lower gauge compared to conventional elastic fibers.

In some embodiments, the fibers of the present invention are melt-spun monofilament fibers and have an ultimate elongation of at least 400% and also have a relatively flat modulus in the load and unload cycle between 100% and 200% elongation. By relatively flat, it is meant that the modulus does not vary as much as it does for other conventional fibers such as nylon and/or polyester.

In some embodiments, the modulus of the fiber (measured by the method described above), on the $5^{th}$ pull cycle, has a modulus that does not increase by more than 400% on the load cycle between 100% and 200% elongation. In some embodiments, the fiber has a denier from 4, 10, 20, 30, 40 70 or even 140 up to 8000, 2000, 1500, 1200, 600, 400, 360, or even 140. Such fibers may on the $1^{st}$ pull cycle, have a modulus that increases, on the load cycle between 100% and 200% elongation, from 50% or 60% up to 150% or 95%. Such fibers may on the $5^{th}$ pull cycle, have a modulus that increases, on the load cycle between 100% and 200% elongation, from 50% or 75% up to 150% or 110%.

In some embodiments, the fibers of the present invention may be described as fibers that, when made to a denier of about 70, on the $1^{st}$ pull cycle, have a modulus that increases, on the load cycle between 100% and 200% elongation, from 70%, 80% or even 85% up to 120%, 100% or even 95%. In some embodiments, the fibers of the present invention may be described as fibers that, when made to a denier of about 70, on the $5^{th}$ pull cycle, have a modulus that increases, on the load cycle between 100% and 200% elongation, from 80%, 90% or even 95% up to 130%, 110% or even 105%.

In some embodiments, the fibers of the present invention may be described as fibers that, when made to a denier of about 140, on the $1^{st}$ pull cycle, have a modulus that increases, on the load cycle between 100% and 200% elongation, from 50%, 55% or even 63% up to 100%, 80% or even 75%. In some embodiments, the fibers of the present invention may be described as fibers that, when made to a denier of about 140, on the $5^{th}$ pull cycle, have a modulus that increases, on the load cycle between 100% and 200% elongation, from 50%, 95% or even 100% up to 150%, 120%, 115% or even 109%.

In some embodiments, the fibers of the present invention may be described as fibers that, when made to a denier of about 360, on the $1^{st}$ pull cycle, have a modulus that increases, on the load cycle between 100% and 200% elongation, from 40%, 60% or even 65% up to 100%, 80%, 85% or even 70%. In some embodiments, the fibers of the present invention may be described as fibers that, when made to a denier of about 360, on the $5^{th}$ pull cycle, have a modulus that increases, on the load cycle between 100% and 200% elongation, from 50%, 60% or even 70% up to 120%, 100%, 80% or even 78%.

It is noted that in the embodiments above, the fiber is not limited to the specific denier size for which the results are specified. Rather, the fibers are described by noting what the modulus would be if the fiber were made to a specific denier and tested. In contrast, the embodiments below deal with fibers of specified denier.

In some embodiments, the fibers of the present invention have denier of from 4, 10, 35, 40 or even 60 up to 130, 100, 80 or even 70. In any of these embodiments, the fibers may have an average denier of about 40 or 70. In such embodiments, the fibers may have a modulus: on the $1^{st}$ pull, on the load cycle between 100% and 200% elongation, from 70%, 80% or even 85% up to 120%, 100% or even 95%; and on the $5^{th}$ pull, on the load cycle between 100% and 200% elongation, from 80%, 90% or even 95% up to 130%, 110% or even 105%.

In some embodiments, the fibers of the present invention have denier of from 80, 90, 100, 120 or even 140 up to 300, 250, 200, or even 160. In some embodiments, the fibers have an average denier of about 140. In any of these embodiments, the fibers may have a modulus: on the $1^{st}$ pull, on the load cycle between 100% and 200% elongation, from 50%, 55% or even 63% up to 100%, 80% or even 75%; and on the $5^{th}$ pull, on the load cycle between 100% and 200% elongation, from 50%, 95% or even 100% up to 150%, 120%, 115% or even 109%.

In some embodiments, the fibers of the present invention have denier of from 150, 200, or even 300 up to 1500, 500, 450 or even 200. In some embodiments, the fibers have an average denier of about 360. In any of these embodiments, the fibers may have a modulus: on the $1^{st}$ pull, on the load cycle between 100% and 200% elongation, from 40%, 60% or even 65% up to 100%, 80%, 85% or even 75%; and on the $5^{th}$ pull, on the load cycle between 100% and 200% elongation, from 50%, 60% or even 70% up to 120%, 100%, 80% or even 78%.

In some embodiments, the present invention may be described by looking to the properties of a Jersey knit fabric made from the fibers described here. In some embodiments, the fiber of the present invention, when knitted into a Jersey fabric, provides a fabric with a burst puncture strength, as measured by ASTM D751, such that the load/thick at failure is at least 710, 800, 900, 1000, 1100, 1200, 1250 lbf/in, or in other embodiments at least 124, 140, 158, 175, 193, 210 or even 219 N/mm. In any of these embodiments, the burst strength may have a maximum value of no more than 1600 or 1500 lbf/in, or in other embodiments of no more than 280 or 263 N/mm.

In some embodiments, the invention is a fiber, according to any of the embodiments described above, where the fiber, if made to 70 denier and then made into a Jersey knit fabric, would provide a Jersey knit fabric with a burst puncture strength (load/thick at failure) of at least 710, 800, 900, 1000, 1200, or even 1250, up to 1400 lbf/in, and in other embodiments at least 124, 140, 158, 175, 210 or even 219, up to 245 N/mm. In any of these embodiments, the fibers may also provide a Jersey knit fabric with a burst puncture strength such that the energy to fail is at least 25, 30, 35, 40, or 40.5 up to 200, 100 or 75 lbf-in, and in other embodiments at least 2.8, 3.4, 4.0, 4.5, or 4.6 up to 22.6, 11.3, or 8.5 N-m. In any of these embodiments, still the fibers may also provide a Jersey knit fabric with a burst puncture strength such that the load at failure is at least 6, 7, 8, or 9 up to 50, 40 or 20 lb, and in other embodiments at least 2.7, 3.2, 3.6 or even 4.1, up to 22.7, 18.1 or 9.1 kg.

In some embodiments, the invention is a fiber, according to any of the embodiments described above, where the fiber, if made to 140 denier and then made into a Jersey knit fabric, would provide a Jersey knit fabric with a burst puncture strength (load/thick at failure) of at least 1200, 1300, 1500, 1700, or even 1750, up to 1900 lbf/in, and in other embodiments at least 210, 228, 263, 298 or even 306, up to 333 N/mm. In any of these embodiments, the fibers may also provide a Jersey knit fabric with a burst puncture strength such that the energy to fail is at least 60, 70, 75, 80, or even 83.5 up to 800, 200, or 150 lbf-in, and in other embodiments at least 6.8, 7.9, 8.5, 9.0, or 9.4 up to 90.3, 22.6, or 16.9 N-m. In any of these embodiments, still the fibers may also provide a Jersey knit fabric with a burst puncture strength such that the load at failure is at least 10, 15, 17, or even 17.5 up to 100, 75, 50, or 25 lb, and in other embodiments at least 4.5, 6.8, 7.7 or even 7.9, up to 45.4, 34.0, 22.7 or 11.3 kg.

In some embodiments, the invention is a fiber, according to any of the embodiments described above, where the fiber, if made to 40 denier and then made into a Jersey knit fabric, would provide a Jersey knit fabric with a burst puncture strength (load/thick at failure) of at least 500, 750, 1000, 1400 or even 1450, up to 1600 or 1500 lbf/in, and in other embodiments at least 88, 131, 175, 245 or even 254, up to 280 or 263 N/mm. In any of these embodiments, the fibers may also provide a Jersey knit fabric with a burst puncture strength such that the energy to fail is at least 10, 15, 20 or even 20.5 up to 100, 75, or 50 lbf-in, and in other embodiments at least 1.1, 1.7, or 2.3 up to 11.3, 8.5, or 5.6 N-m. In any of these embodiments, still the fibers may also provide a Jersey knit fabric with a burst puncture strength such that the load at failure is at least 3, 4, 4.5 or even 5 up to 40, 20, or 10 lb, and in other embodiments at least 1.4, 1.8, 2.0, or even 2.3, up to 18.1, 9.1, or 4.5 kg.

It is noted that in the embodiments above, the fiber is not limited to the specific denier size for which the results are specified. Rather, the fibers are described by noting what the burst strength of the Jersey knit fabric made from the fiber would be if the fiber were made to a specific denier and tested. In contrast, the embodiments below deal with fibers of specified denier.

In some embodiments, the fibers of the present invention have denier of from 4, 10, 35, or even 60 up to 130, 100, or even 80 denier, and in some embodiments an average denier of about 70. In any of these embodiments, the fibers may provide a Jersey knit fabric with a burst puncture strength of at least 710, 800, 1000, 1200, or even 1250, up to 1400 lbf/in, and in other embodiments at least 124, 140, 175, 210 or even 219, up to 245 N/mm. In any of these embodiments, the fibers may also provide a Jersey knit fabric with a burst puncture strength such that the energy to fail is at least 25, 30, 35, 40, or 40.5 up to 200, 100 or 75 lbf-in, and in other embodiments at least 2.8, 3.4, 4.0, 4.5, or 4.6 up to 22.6, 11.3, or 8.5 N-m. In any of these embodiments, still the fibers may also provide a Jersey knit fabric with a burst puncture strength such that the load at failure is at least 6, 7, 8, or 9 up to 50, 40 or 20 lb, and in other embodiments at least 2.7, 3.2, 3.6 or even 4.1, up to 22.7, 18.1 or 9.1 kg.

In some embodiments, the fibers of the present invention have denier of from 80, 90, 100, 120 or even 140 up to 300, 250, 200, or even 160, or in some embodiments an average denier of about 140. In any of these embodiments, the fibers may provide a Jersey knit fabric with a burst puncture strength (load/thick at failure) of at least 1200, 1300, 1500, 1700, or even 1750, up to 1900 lbf/in, and in other embodiments at least 210, 228, 263, 298 or even 306, up to 333 N/mm. In any of these embodiments, the fibers may also provide a Jersey knit fabric with a burst puncture strength such that the energy to fail is at least 60, 70, 75, 80, or even 83.5 up to 800, 200, or 150 lbf-in, and in other embodiments at least 6.8, 7.9, 8.5, 9.0, or 9.4 up to 90.3, 22.6, or 16.9 N-m. In any of these embodiments, still the fibers may also provide a Jersey knit fabric with a burst puncture strength such that the load at failure is at least 10, 15, 17, or even 17.5 up to 100, 75, 50, or 25 lb, and in other embodiments at least 4.5, 6.8, 7.7 or even 7.9, up to 45.4, 34.0, 22.7 or 11.3 kg.

In some embodiments, the fibers of the present invention have denier of from 20, 30, 35, or even 40 up to 100, 75, 60, or even 50, or in some embodiments an average denier of about 40. In any of these embodiments, the fibers may provide a Jersey knit fabric with a burst puncture strength (load/thick at failure) of at least 500, 750, 1000, 1400 or even 1450, up to 1600 or 1500 lbf/in, and in other embodiments at least 88, 131, 175, 245 or even 254, up to 280 or 263 N/mm. In any of these embodiments, the fibers may also provide a Jersey knit fabric with a burst puncture strength such that the energy to fail is at least 10, 15, 20 or even 20.5 up to 100, 75, or 50 lbf-in, and in other embodiments at least 1.1, 1.7, or 2.3 up to 11.3, 8.5, or 5.6 N-m. In any of these embodiments, still the fibers may also provide a Jersey knit fabric with a burst puncture strength such that the load at failure is at least 3, 4, 4.5 or even 5 up to 40, 20, or 10 lb, and in other embodiments at least 1.4, 1.8, 2.0, or even 2.3, up to 18.1, 9.1, or 4.5 kg.

The fibers of the present invention may be monofilament fibers. In some embodiments, the fibers have a diameter of 10, 30, 40 or even 45 up to 500, 400, 300 or even 200 microns.

In some embodiments, the fibers of the present invention: when made to a denier of 20 will have a diameter of 20 or 30 to 55 or 50 microns; when made to a denier of 40 will have a diameter of 40 or 60 to 85 or 80 microns; when made to a denier of 70 will have a diameter of 75 or 80 to 130 or 100 microns; when made to a denier of 140 will have a diameter of 80 or 100 to 300 or 150 microns; when made to a denier of 360 will have a diameter of 175 or 190 to 225 or 210 microns; or any combination thereof.

It is noted that in the embodiments above, the fiber is not limited to the specific denier size or diameter provided. Rather, the fibers are described by noting what the diameter the fiber would have if the fiber were made to a specific denier. In contrast, the embodiments below deal with fibers of specified denier.

In some embodiments, the fibers of the present invention have a denier of 10 to 30, or an average of about 20, and in such embodiments the fibers have a diameter of from 10, 20 or even 30 to 65, 60, 55 or even 50 microns, and in some embodiments an average diameter of 48 microns.

In some embodiments, the fibers of the present invention have a denier of 30 to 40, or an average of about 30, and in such embodiments the fibers have a diameter of from 20, 30, 40 or even 60 to 115, 100, 85 or even 80 microns, and in some embodiments an average diameter of 73 microns.

In some embodiments, the fibers of the present invention have denier of from 4, 10, 35 or even 60 up to 130, 100, or 80, or an average of about 70. In such embodiments, the fibers have a diameter of from 50, 60, 70, 75, or even 80 to 220, 200, 150, 130, or even 100 microns, and in some embodiments an average diameter of 89 microns.

In some embodiments, the fibers of the present invention have denier of from 80, 90, 100, 120 or 140 up to 300, 250, 200, or 160. In some embodiments, the fibers have an average denier of about 140. In such embodiments, the fibers have a diameter of from 50, 70, 80, or even 100 to 300, 250, 200, or even 150 microns, and in some embodiments an average diameter of 128 microns.

In some embodiments, the fibers of the present invention have denier of from 150, 200, or even 300 up to 1500, 500, 450 or even 200. In some embodiments, the fibers have an average denier of about 360. In such embodiments, the fibers have a diameter of from 100, 150, 175, or even 190 to 400, 250, 225, or even 210 microns, and in some embodiments an average diameter of 198 microns.

In some embodiments, the diameter of the fiber of the present invention is described by a formula where the diameter of the fiber, in microns, is approximately equal to 11.7 times the denier of the fiber raised to the power of 0.48 (Diameter=$11.7 \times \text{Denier}^{0.48}$). In some embodiments, the diameter of the fiber is within a 20, 10 or even 5 micron range centered on the result of the described equation.

In some embodiments, the fiber of the present invention has a denier of 40 to 90; a modulus, on the $5^{th}$ pull cycle, that increases between 80 and 130% on the load cycle between 100% and 200% elongation; a burst puncture strength, when made into a Jersey knit fabric, as measured by ASTM D751, such that the load/thick at failure for the fabric is between 710 and 1600 lbf/in (124 and 280 N/mm); and is monofilament with a diameter of 80 to 100 microns.

In some embodiments, the fiber of the present invention has a denier of 90 to 160; a modulus, on the $5^{th}$ pull cycle, that increases between 50 and 120% on the load cycle between 100% and 200% elongation; and is monofilament with a diameter of 100 to 150 microns.

In some embodiments, the fiber of the present invention has a denier of 300 to 400; a modulus, on the $5^{th}$ pull cycle, that increases between 50 and 150% on the load cycle between 100% and 200% elongation; and is monofilament with a diameter of 180 to 220 microns.

The invention will be better understood by reference to the following non-limiting examples.

EXAMPLES

Example Set 1

A set of nine example resins are made by reacting in a continuous reactor: (i) 75.5 parts by weight of a polyester polyol derived from adipic acid with a 50/50 molar mixture of 1,4-butanediol and 1,6-hexanediol where the polyol is prepared in a batch reactor at a reaction temperature of about 125 degrees C. and then vacuum dried where the polyol has a number average molecular weight (Mn) of about 2500; (ii) 20 parts by weight MDI; and (iii) 4.5 parts by weight 1,4-butanediol as a chain extender. During the continuous reaction, 0.08 parts by weight of a lubricant package is added, where the package consists of a 90/10 weight mixture of Acrawax C beads and Glycolube VL. The polymer is allowed to react until the desired weight average molecular weight (Mw) of the elastomer (>600,000) is obtained.

The resulting elastomer resins have weight average molecular weights (Mw) that range from 687,055 to 1,015,685 and polydispersity indexes (PDI) that range from 3.05 to 5.42. The results for each resin example are summarized in the table below, where the molecular weight is measured by GPC:

TABLE I

Resin Example Data

| Example No | Mw | Mn | PDI |
| --- | --- | --- | --- |
| 1-1 | 1015685 | 187547 | 5.42 |
| 1-2 | 1010920 | 207489 | 4.87 |
| 1-3 | 865767 | 240537 | 3.60 |
| 1-4 | 883539 | 283921 | 3.11 |
| 1-5 | 919746 | 274819 | 3.35 |
| 1-6 | 758603 | 205217 | 3.70 |
| 1-7 | 693608 | 160449 | 4.32 |
| 1-8 | 687055 | 166669 | 4.12 |
| 1-9 | 723693 | 237454 | 3.05 |

Example Set 2

The elastomer resins described in Example Set 1 are melt spun into 40 denier fibers (Example 2-1), 70 denier fibers (Example 2-2) and 140 D fibers (Example 2-3) by adding 90 parts by weight of the elastomer resin to a reactive extruder along with 10 parts by weight of Hyperlast 5196, an isocyanate terminated polyether with a number average molecular weight of 1500. A conventional melt spinning process is used where the polymer melt is passed through a spinning nozzle selected to give the desired denier fiber. The strands exit the nozzle into air as strands, where the strands are solidified by cooling and then collected by winding the fibers in a winding device. The fibers are allowed to cure until the desired weight average molecular weights (>700,000) are obtained.

Example Set 3

The elastomer resin formulation described for the examples in Example Set 1 is processed in a reactive extruder in order to evaluate its processing characteristics. In this extrusion quality test procedure, a resin is processed into extruded film test parts. An image analysis system interprets video images from a camera that views the film test parts from an overhead projector. The system analyzes the images of the test parts, identifying and counting defects in the test parts. The nominal size of defects detectable by the system is from 80 to 500 microns.

Five specimens of extruded film are taken from a product sample. The specimens are placed on an overhead projector and the image projected onto a screen. A video camera captures and transfers the image to a computer where image analysis software interprets and analyzes the signal. A measurement of the number of defects captured within 4 square inches of each specimen is recorded. The values for the five specimens are averaged and a final Image Analysis (IA) result is reported. An IA value of less than 20 is generally acceptable for cable and other thick profile applications, while an IA value of less than 10 is generally acceptable for blown film and fiber applications. A lower the IA value, the better the extrusion processing properties of the material.

The table below summarizes data collected on parts made from resin processed in an extruder during an extruder processing run. The resin used for all the examples is the same resin formulation described in Example Set 1 above.

TABLE II

Extrusion Quality Data

| Ex ID | IA Value |
|---|---|
| 3-1 | 4 |
| 3-2 | 4 |
| 3-3 | 4 |
| 3-4 | 4 |
| 3-5 | 3 |
| 3-6 | 4 |
| 3-7 | 4 |
| 3-8 | 3 |
| 3-9 | 3 |
| 3-10 | 3 |
| 3-11 | 3 |
| 3-12 | 3 |
| 3-13 | 3 |
| 3-14 | 3 |
| 3-15 | 3 |
| 3-16 | 3 |
| 3-17 | 4 |
| 3-18 | 4 |
| 3-19 | 4 |
| 3-20 | 4 |
| 3-21 | 4 |
| 3-22 | 4 |
| 3-23 | 4 |
| 3-24 | 3 |
| 3-25 | 3 |
| 3-26 | 3 |
| 3-27 | 3 |
| 3-28 | 4 |
| 3-29 | 3 |
| 3-30 | 3 |
| 3-31 | 4 |
| 3-32 | 3 |
| 3-33 | 3 |
| 3-34 | 3 |
| 3-35 | 3 |
| 3-36 | 3 |
| 3-37 | 3 |
| 3-38 | 3 |
| 3-39 | 4 |
| 3-40 | 4 |
| 3-41 | 4 |
| 3-42 | 4 |
| 3-43 | 4 |
| 3-44 | 4 |
| 3-45 | 4 |
| 3-46 | 4 |
| 3-47 | 4 |

The results show that the resins of the invention exhibit excellent processing characteristics and are very extrudable.

Example Set 4

The 40 denier fiber of Example set 2 (Example 2-1), and a commercially available fiber of the same denier are tested to evaluate their alkali resistance. The fiber to be tested is wrapped around a Teflon™ card 180 times. Four separate test parts are prepared for each fiber material being tested. After winding, the fiber end is secured on each test part and the resulting test parts are submerged in a solution that is 4% by weight bleach (Chlorox™ bleach) and 0.2% by weight anionic detergent (Tide™ detergent). The solution is held at 70° C. during the testing. Test parts are removed after 30, 60, 120 and 240 minutes of exposure. Once removed from the solution, the parts are washed in de-ionized water and then allowed to air dry for about 12 hours. After the drying period, each part is tested. The parts are tested by removing a 5 cm long sample of the exposed fiber and testing its physical properties using a tensiometer configured with the load cell on top and the crosshead moving down. The crosshead is moving at 100 mm/min. A sample of fiber not exposed to the solution is also tested as a baseline. The difference in the tenacity (measured in grams per denier) is measured, indicating the fiber's alkali resistance. The smaller the impact on the fiber's tenacity, the better its alkali resistance. The table below summarizes the results from the alkali resistance testing:

TABLE III

Alkali Resistance Data

| Time | Example 3-1 40D Fiber (Ex 2-1) | | Example 3-2 Comparative 40D Fiber[2] | |
|---|---|---|---|---|
| (min) | Tenacity | % Loss | Tenacity | % Loss |
| 0 (baseline) | 1.365 | 0 | 1.565 | 0 |
| 30 | 0.897 | 34.29 | 0.509 | 67.48 |
| 60 | 0.701 | 48.64 | 0.215 | 86.26 |
| 120 | 0.506 | 62.83 | BROKE[1] | NA |
| 240 | BROKE[1] | NA | BROKE[1] | NA |

[1] A designation of "BROKE" means the fiber physically broke before testing could be completed.
[2] The comparative fiber included in this testing is 40D LYCRA ™ 162C, a commercially available 40 denier fiber, marketed by INVISTA ™.

The results show that the fibers made from the resins of the invention have significantly better alkali resistance compared to other commercially available fibers.

Example Set 5

The 140 denier fiber of Example set 2 (Example 2-3), the 70 denier fiber of Example Set 2 (Example 2-2) and a commercially available 70 denier fiber are tested to evaluate their caustic resistance. The fiber to be tested is wrapped around a Teflon™ card 180 times. Four separate test parts are prepared for each fiber material being tested. After winding, the fiber end is secured on each test part and the resulting test parts are submerged in a solution that is 3% by weight caustic (NaOH). The solution is held at 100° C. for a 90 min exposure period. Once removed from the solution, the parts are washed in de-ionized water and then allowed to air dry for about 12 hours. After the drying period, each part is tested. The parts are tested by removing a 5 cm long sample of the exposed fiber and testing its physical properties using a tensiometer configured with the load cell on top and the crosshead moving down. The test is 5 cycles stretching to 300% and a $6^{th}$ cycle stretching to break. The crosshead is moving at 100 mm/min. The tensiometer test software measures the gf/den (gram force/denier), on load pull at elongations of 100%, 150%, 200%, and 300%. It also measures the gf/den on the unload pull at 200%, 150%, and 100%. Both the load and unload pulls are measured on the $1^{st}$ and $5^{th}$ cycle. Other values recorded are maximum load (gf/den), elongation at max load (%), load at break (gf/den), and elongation at break (%). The final value measured is % set on $1^{st}$ and $5^{th}$ cycles. % set is the length at witch the load reaches 0 on the unload pull minus original length, divided by the original length (i.e., 6-5/5=20%). The table below summarizes the tenacity and $5^{th}$ cycle modulus results. A sample of fiber not exposed to the solution is also tested as a baseline. The difference in the tenacity (measured in grams per denier) is measured, indicating the fiber's caustic resistance. The smaller the impact on the fiber's tenacity, the better its caustic resistance.

TABLE IV

Caustic Resistance Data

| | Example 4-1 140D Fiber (Ex 2-3) | | | Example 4-2 70D Fiber (Ex 2-2) | | | Example 4-3 70D Comp Fiber[1] | | |
|---|---|---|---|---|---|---|---|---|---|
| | Before (gm/d) | After (gm/d) | % loss | Before (gm/d) | After (gm/d) | % loss | Before (gm/d) | After (gm/d) | % loss |
| Tenacity | 1.272 | 1.205 | 5.27 | 1.344 | 1.386 | +3.1 | 1.401 | 1.083 | 22.7 |
| 300% modulus ($5^{th}$ cycle) | 0.166 | 0.131 | 21.08 | 0.241 | 0.159 | 34 | 0.241 | 0.157 | 34.9 |

[1]The comparative fiber included in this testing is 70D LYCRA ™ 162C, a commercially available 70 denier fiber, marketed by INVISTA ™.

The results show that the fibers made from the resins of the invention have significantly better caustic resistance compared to other commercially available fibers.

Example Set 6

Several example fabrics are prepared and tested to determine how balanced the fabric is. The balance of a fabric depends on both the combination and compositions of the fibers used to make it as well as the construction of the fabric itself. A fabric is often described by citing its content, which is related to the mix of fibers present, and its weight, which is related to its construction. The examples here are believed to be of the same general type of construction and, within each sample set, the inventive sample has been prepared to match the weight of the comparative example, thus allowing for a meaningful comparison.

Several fabrics are prepared and tested and compared to two commercially available fabrics. All of the fabrics, including the commercial samples, are of a single layer jersey construction and made with two fibers, an example fiber and a nylon fiber, present as a co fiber. Each of the fabrics, including the commercial samples, have been heat set, dyed and finished before testing.

Example 6-1 is an inventive example of a fabric made from the fibers of Example 2-2 (70 D fibers of the invention) and nylon of a similar denier. Example 6-2 is a comparative example made from LYRCA™, a commercially available spandex type fiber marketed by INVISTAT™, and nylon. The fiber content of the Example 6-1 was chosen so that the weights of 6-1 and 6-2 would match, allowing for a meaningful comparison.

Example 6-3 is an inventive example made from the fibers of Example 2-2 (70 D fibers of the invention) and nylon. Example 6-4 is a comparative example made from LYRCA™ fibers and nylon. The fiber content of the Example 6-3 was chosen so that the weights of 6-3 and 6-4 would match, allowing for a meaningful comparison.

Example 6-5 is an inventive example made from the fibers of Example 2-1 (40 D fibers of the invention) and nylon. The fiber content is 60:40 Example 2-1 fibers:nylon, giving a 36 gauge fabric.

Each of the fabric examples above is tested to determine its balance. The balance of the fabric is tested by stretching a sample of fabric in the length direction at a cycle speed of 20 in/min and a speed conditioning cycle of 1000 mm/min, monitoring the amount of force-stress, measured in lbf, applied to fabric relative to the percent stretch seen in the fabric, up to a maximum force-stress of 15 lbf. The same procedure is then carried out on the fabric but in the width direction. The closer the results for the fabric in length and width directions, the more balanced the fabric is. For the applications of interest for the invention, a fabric should have results in both directions that are within 20% and allow for more than 100% elongation in both directions at 15 lbf. The table below summarizes the results when evaluating the balance of the fabrics.

TABLE V

Fabric Example Data

| Example No | Force-Stress at 40% Stretch | Force-Stress at 60% Stretch | Force-Stress at 80% Stretch | % Stretch at Maximum Force (15 lbf) |
|---|---|---|---|---|
| 6-1 LENGTH | 2.29 lbf | 4.01 lbf | 6.14 lbf | 120.81% |
| 6-1 WIDTH | 1.66 lbf | 2.76 lbf | 4.23 lbf | 124.57% |
| 6-2 LENGTH | 3.27 lbf | 8.77 lbf | NA | 73.68% |
| 6-2 WIDTH | 0.68 lbf | 1.49 lbf | 2.38 lbf | 159.33% |
| 6-3 LENGTH | 2.22 | 3.29 | 4.60 | 134.85% |
| 6-3 WIDTH | 1.84 | 2.90 | 4.06 | 156.42% |
| 6-4 LENGTH | 1.17 | 2.60 | 6.43 | 97.20% |
| 6-4 WIDTH | 1.39 | 2.32 | 3.53 | 138.76% |
| 6-5 LENGTH | 1.12 | 1.79 | 2.38 | 230.83% |
| 6-5 WIDTH | 1.01 | 1.67 | 2.30 | 225.95% |

The results show that the fabrics of the invention are much more balanced than the comparative examples, which for Example 6-2 did not even reach 80% elongation under 15 lbf of force-stress in the length direction, and which for Example 6-4 did not reach 100%. The inventive examples show comparable force-stress levels at corresponding stretch percentages in both the length and width directions up to the maximum force-stress, indicating very well balanced fabrics.

While in accordance with the patent statutes, the best mode and preferred embodiment has been set forth, the scope of the invention is not limited thereto, but rather by the scope of the attached claims.

What is claimed is:

1. A melt-spun fiber made from a resin comprising the reaction product of
   (i) a hydroxyl terminated polyester intermediate derived from a dicarboxylic acid and a blend of at least two alkylene glycols wherein two of the alkylene glycols have a number average molecular weight that differs by at least 20 percent;
   (ii) a diisocyanate and
   (iii) a linear alkylene glycol chain extender;
   wherein the resin has a weight average molecular weight of at least 600,000; and wherein the resin is further reacted with:
   (iv) an agent comprising the reaction product of a polyalkylene ether glycol and a diisocyanate;
   wherein said fiber has a weight average molecular weight of at least 700,000.

2. The fiber of claim 1 wherein component (iv) is derived from a polyalkylene ether glycol comprising polytetramethylene ether glycol.

3. The fiber of claim 1 wherein component (iv) is derived from a diisocyanate comprising methylene diphenyl diisocyanate.

4. A fabric made from the fiber of claim 1.

5. An article made from the fabric of claim 4.

6. The fiber of claim 1 wherein component (i) is derived from a carboxylic acid comprising adipic acid.

7. The fiber of claim 1 wherein component (i) is derived from a 25:75 to 75:25 mixture, on a weight basis, of 1,4-butanediol and 1,6-hexanediol.

8. The fiber of claim 1 wherein component (ii) comprises methylene diphenyl diisocyanate.

9. The fiber of claim 1 wherein component (iii) comprises 1,4-butanediol, 1,6-hexanediol, or combinations thereof.

10. A method of making a fiber comprising the steps of:
   I. preparing an elastomer resin in an internal mixing device wherein said elastomer resin is prepared by reacting:
      a hydroxyl terminated polyester intermediate derived from a dicarboxylic acid and a blend of at least two alkylene glycols wherein two of the alkylene glycols have a number average molecular weight that differs by at least 20 percent;
      (ii) a diisocyanate and
      (iii) a linear alkylene glycol chain extender;
      wherein the resulting resin has a weight average molecular weight of at least 600,000;
   II. further reacting the resin composition with
      (iv) an agent comprising the reaction product of a polyalkylene ether glycol and a diisocyanate; and
   III. processing said elastomer resin into a fiber, film, or hose wherein said fiber, film, or hose has a weight average molecular weight of at least 700,000.

* * * * *